April 30, 1946.    G. H. FRANGQUIST    2,399,177
VARIABLE SPEED DEVICE
Filed May 1, 1943    3 Sheets-Sheet 1
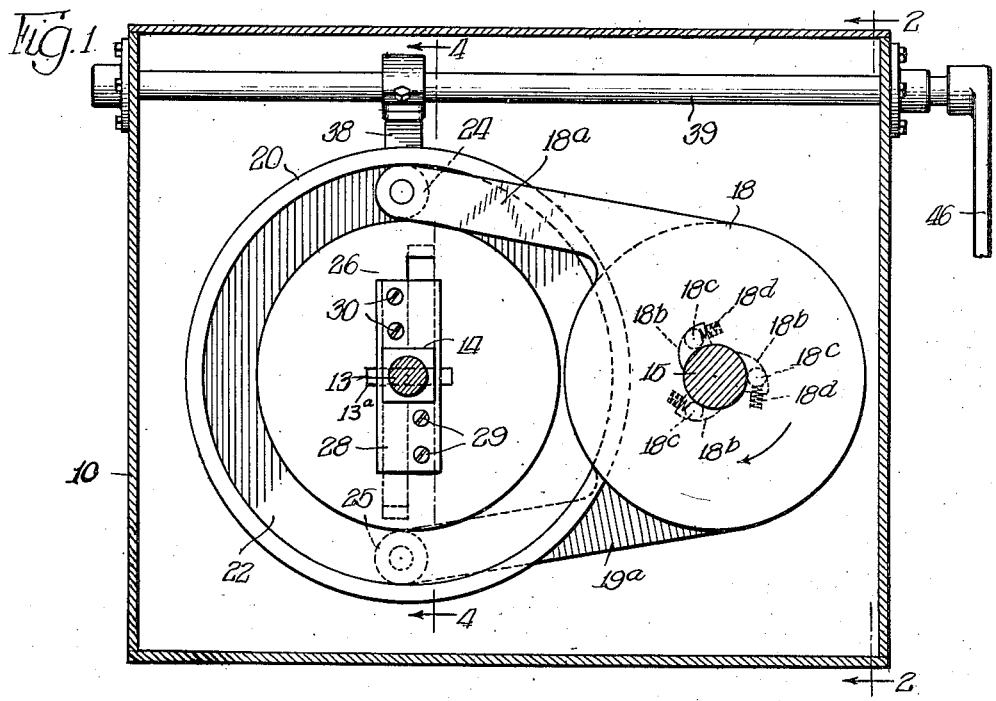
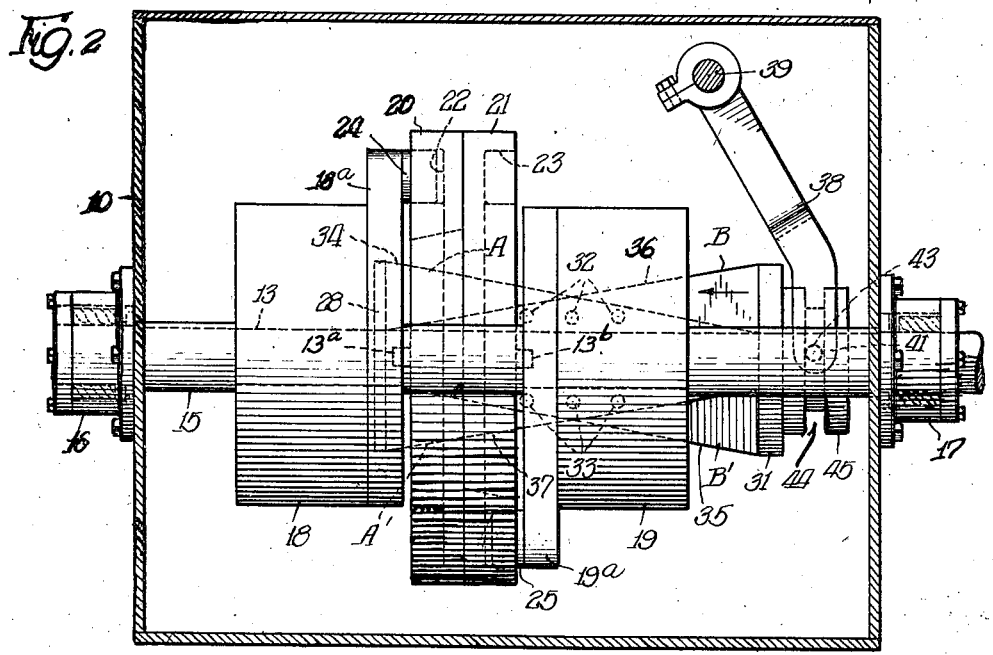
INVENTOR.
Gustav H Frangquist,
BY
Barnett & Truman
attys April 30, 1946. G. H. FRANGQUIST 2,399,177
VARIABLE SPEED DEVICE
Filed May 1, 1943 3 Sheets-Sheet 2
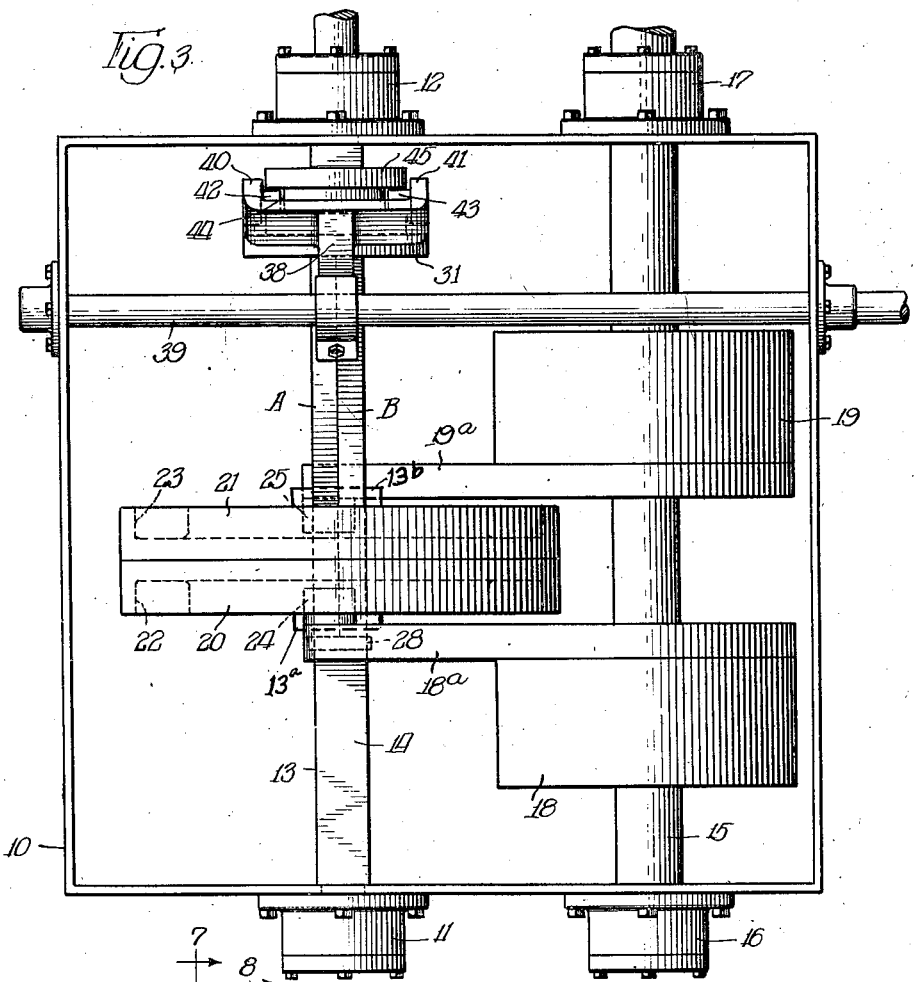
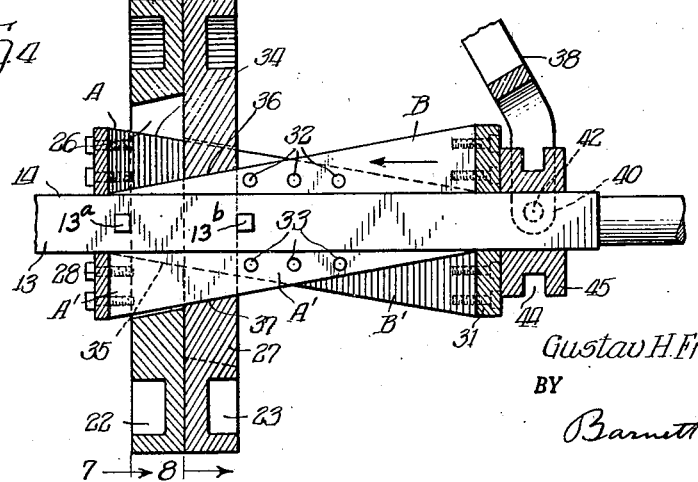
INVENTOR.
Gustav H. Frangquist,
BY
Barnett + Truman
Attys

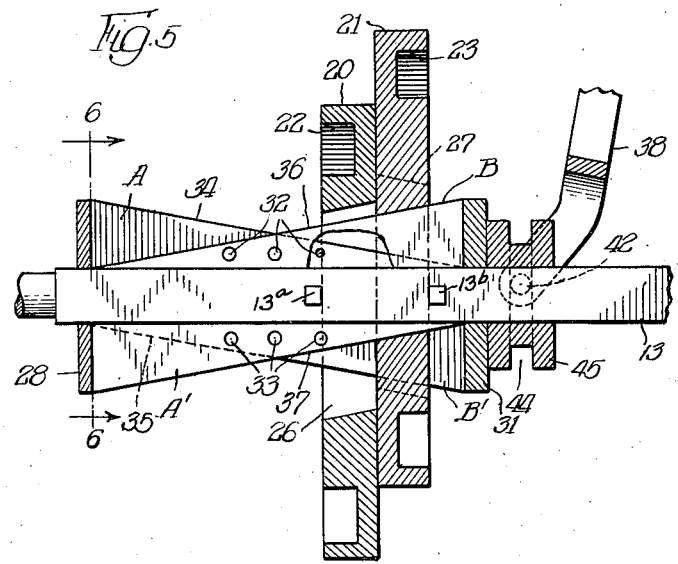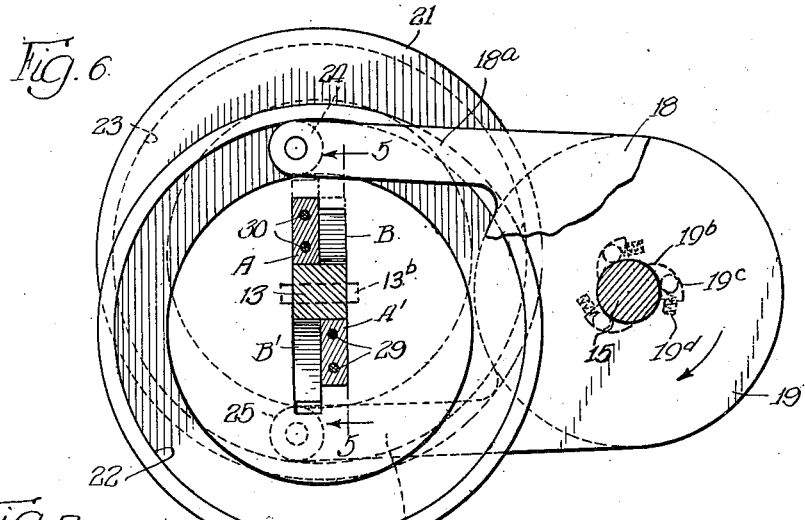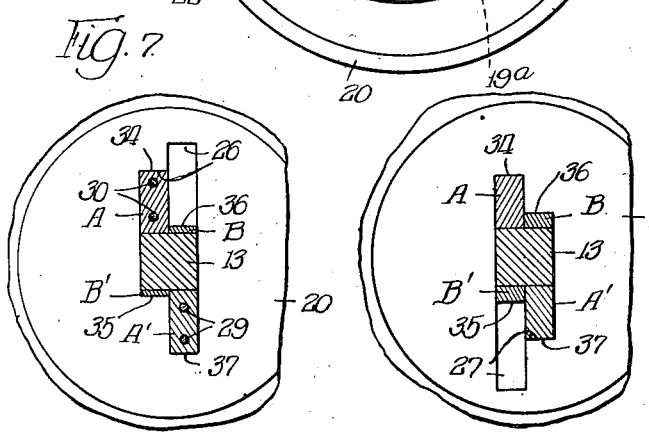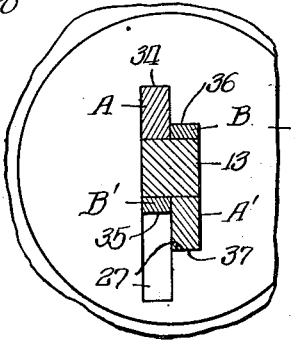

Patented Apr. 30, 1946

2,399,177

UNITED STATES PATENT OFFICE 2,399,177

VARIABLE-SPEED DEVICE

Gustav H. Frangquist, Chicago, Ill., assignor to Combustion Engineering Company, Inc., New York, N. Y., a corporation of Delaware Application May 1, 1943, Serial No. 485,303

5 Claims. (Cl. 74—124)

This invention relates to certain new and useful improvements in variable speed mechanism.

A principal object of the invention is to provide a simplified speed change mechanism in which a drive shaft or other element, operable at a substantially constant speed, is operatively connected to a driven member by a mechanism adapted to vary the speed of the driven member from a stationary or zero position to a pre-determined maximum speed without altering the operating speed of the drive mechanism.

Another object is to provide a mechanism of he above character in which the driven shaft otates in only one direction regardless of the direction in which the drive shaft is operated, thereby making it practicable to use the improved mechanism in situations where the drive shaft is operated continuously in one direction or in situations in which the drive shaft is operated by oscillatory movements.

A further object of the invention is to provide a mechanism of the above character in which the several parts are disposed in compact arrangement and are suitably balanced so as to be suitable for high speed as well as low speed operations.

Other objects and advantages of the invention will be more apparent from the following detailed description of the approved form of the apparatus illustrated in the drawings.

In the accompanying drawings:

Fig. 1 is an end view partly in section of a variable speed transmission mechanism constructed in accordance with this invention.

Fig. 2 is a fragmentary sectional view taken on line 2—2 of Fig. 1 looking in the direction indicated by the arrows.

Fig. 3 is a plan view of the mechanism illustrated in Figs. 1 and 2, but with the top cover of the casing removed.

Fig. 4 is a fragmentary sectional view taken substantially on line 4—4 of Fig. 1 and illustrating the parts in their neutral position.

Fig. 5 is a sectional view taken on line 5—5 of Fig. 6.

Fig. 6 is a fragmentary sectional view taken substantially on line 6—6 of Fig. 5 looking in the direction of the arrows; and Figs. 7 and 8 are sectional views taken on lines 7—7 and 8—8, respectively, of Fig. 4.

Referring now to the specific constructions of the invention illustrated in the drawings:

A housing for the operating parts of the mechanism is indicated by the reference numeral 10. Antifriction bearing members 11 and 12 are disposed at opposite sides of the housing for receiving a drive shaft 13. The said bearings are shown as formed separate from the housing and bolted to the side walls thereof. However, the specific form of bearings and the manner of their attachment to the housing are not important in so far as the broader features of this invention are concerned. It will be apparent, therefore, that they may be altered to meet the requirements of any special installation. The portion of the drive shaft enclosed within the housing 10 is preferably square in cross-section, as indicated at 14, for a purpose which will be described hereinafter. A driven shaft is journaled in anti-friction bearings 16, 17, similar to the bearings 11 and 12 previously described. A pair of clutch devices 18, 19 are mounted on the driven shaft 15 in spaced relation to each other. Preferably the said clutch devices are in the form of levers provided with arms 18$^a$, 19$^a$, respectively, which embrace a pair of cam members 20, 21 mounted on the drive shaft 13. The clutch devices are preferably of the roller type which, when operated in one direction grip the shaft 15, but when operated in a reverse direction, release their grip on the shaft.

The construction of clutch device 18 is illustrated best in Fig. 1. The bearing opening of the clutch body is provided with a plurality of radial recesses 18$^b$ which diminish in depth inwardly toward the shaft 15. Rollers 18$^c$ are inserted in the said recesses 18$^b$ and urged toward the narrow end of the recesses by means of suitable springs 18$^d$. It will be seen by reference to Fig. 1 that upward movement of the clutch arm 18$^a$ will cause the rollers 18$^c$ to bind or cramp between the outer walls of the recesses 18$^b$ and the shaft 15. Consequently, the said upward movement of the arm 18$^a$ will impart a rotation to the said shaft 15 in the direction indicated by the arrow in Fig. 1. The movement of the clutch arm 18$^a$ in the opposite direction will tend to move the rollers 18$^c$ toward the large ends of the recesses against the pressure of the springs 18$^d$ and, therefore, release the clutch 18 from its operative engagement with the shaft 15.

The clutch device 19 is made the same as clutch 18, so that downward movement of the arm 19$^a$ of clutch 19 will cause the rollers 19$^c$ to move into binding engagement between the tapered walls of the recesses 19$^b$ and the shaft 15. The clutches are oscillated simultaneously, but in opposite directions, so that one clutch exerts a gripping action on the shaft 15, while the other clutch is released therefrom. Specifically, during the movements of the clutch arms 18ª and 19ª toward each other, the clutch 19 is in gripping engagement with the shaft 15, and during the movement of the said clutch arms 18ª and 19ª away from each other, the clutch 18 is in gripping engagement with the said shaft 15.

The clutch devices 18 and 19 are operated by means of the cam members 20—21 which are mounted on and rotate with the drive shaft 13, but are held from moving lengthwise of the shaft by pins 13ª—13ᵇ or by other suitable holding means. The cam members are in the form of discs arranged back to back and formed in their outer vertical faces with cam grooves 22, 23, respectively. The cam groove 22 receives a roller 24 which is carried at the outer end of the arm 18ª of the clutch 18. The cam groove 23 receives a similar roller 25 carried at the outer end of the arm 19ª of clutch 19. However, the arrangement of the clutch arms 18ª, 19ª are such that the rollers 24, 25 are disposed on opposite sides of the drive shaft 13.

By reference to Figs. 1, 2 and 3 it will be seen that the cam discs 20, 21 are arranged to coincide with each other. In this position of the discs their cam grooves 22, 23 are concentric with the longitudinal axis of the drive shaft 13. Under this condition the rotation of the drive shaft and the consequent rotation of the cam discs will not impart any operative movement to the arms 18ª, 19ª of the clutch members. However, if the cam discs are adjusted relative to each other in a direction transversely of the drive shaft so as to position their respective cam grooves 22, 23 eccentric to the longitudinal axis of the drive shaft, rotation of the drive shaft in either forward or reverse direction will impart vertical oscillating movement to the arms 18ª, 19ª. The extent of such movement will depend upon the extent of this adjustment. In order to permit adjusting of the discs, they are formed with elongated openings 26, 27. The openings 26, 27 correspond in width to the thickness of the square portion 14 of the drive shaft 13, but are sufficiently long to permit the desired adjustment of the discs transversely of the shaft in opposite directions. The above adjustment of the discs 20, 21 is accomplished, in the present embodiment, by means of a plurality of wedges which are supported on the drive shaft 13 so as to slide lengthwise of the shaft through the openings 26, 27 of the discs. The said wedges are designated in the drawings by the reference characters A—A', B—B' and are secured together so that the four wedges move as a unit. The wedges A—A' slidably engage opposite flat faces of the drive shaft and are also disposed on opposite sides of the vertical center of the shaft, as viewed in Figs. 1 and 6 of the drawings. In the present embodiment the wedges A—A' are formed separately and secured at their wide ends to a plate 28 by means of the screws 29, 30. However, they could obviously be formed integrally with the plate if desired. The wedges B—B' are similarly arranged on the drive shaft 13 and secured to plate 31 so that they will overlap the sides of the wedges A—A'. The intermediate portion of wedges A and B are secured together by means of flush rivets 32, or by other suitable means. The wedges A' and B' are similarly secured together by means of flush rivets 33. It will be seen, therefore, that the four wedges are secured together to provide a unitary device.

By inspection of Figs. 2, 4 and 5, it will be seen that the inclined faces of wedges A and B' are parallel to each other throughout their entire length, but at an angle to the shaft 13, and that they engage correspondingly inclined surfaces 34, 35 at the upper and lower ends, respectively, of the elongated opening 26 of the cam disc 20. It will also be seen that movement of the wedges A—B' toward the left from the position shown in Fig. 4 toward the position shown in Fig. 5 will result in moving the cam disc 20 transversely of the shaft 13 to a position eccentric to the longitudinal axis of the shaft as shown in Figs. 5 and 6. The tapered surfaces of wedges B and A' are parallel with each other and extend at an angle to the shaft 13 but in the opposite direction. The inclined faces of these wedges engage correspondingly inclined faces 36, 37 at the opposite ends of opening 27 in cam disc 21. It will be seen, therefore, that the movement of the wedges B—A' along the shaft from the position shown in Fig. 4 toward the position shown in Fig. 5 will move the cam disc 21 transversely of the drive shaft 13 to a position eccentric to the longitudinal axis of the shaft.

Assuming that the drive shaft 13 is rotated in either direction while the cam discs 20, 21 are adjusted to the eccentric positions indicated in Figs. 5 and 6, the rotation of the discs with the shaft will move the arms 18ª and 19ª toward and away from each other, and thereby effect the clutching and releasing actions previously described in connection with the clutch members 18, 19. The said cam discs 20, 21 can be adjusted to any position intermediate the neutral or zero position shown in Figs. 2, 3 and 4 to the maximum position of adjustment indicated in Figs. 5 and 6. During this range of adjustments the speed of rotation of the driven shaft 15 is increased from zero to a certain pre-determined maximum as represented by the adjustment of Figs. 5 and 6. The said wedges A, B' and B, A' being of identical construction, the movement of the wedges as a unit lengthwise of the drive shaft 13 effects identical adjustments of the cam disc 20, 21 but in opposite directions. This operation of the wedges may be effected by any suitable means, for example, a lever 38 fixed to a rock-shaft 39 and having portions 40, 41 provided with studs 42, 43 which extend into groove 44 of a revoluble thrust member 45. The member 45 is secured to the plate 31 of the wedge unit. The arm 38 may be moved from one position to any other desired position of adjustment by means of a hand lever 46 secured to the shaft 39 at a location outside the housing 10.

*Summary of operation*

When the disc cams 20, 21 are in the position indicated in Figs. 1 to 4, inclusive, the operation of the drive shaft 13 will not impart any movement to the clutch members 18, 19 because the outer ends of arms 18ª, 19ª will remain in fixed position relative to the longitudinal axis of the drive shaft. This position of the said arms 18ª, 19ª relative to said axis of the shaft is changed by shifting the cam discs 20, 21 in opposite directions transversely of the drive shaft, for example, to a position such as indicated in Figs. 5 and 6. The said cam discs are shifted relative to each other by movement of the cooperating wedges A—B' and B—A' as a unit lengthwise of the drive shaft. In this way the inclined faces of wedges disposed on opposite sides of the shaft serve to move the cam discs in opposite directions transversely of the shaft. This movement positions the cam grooves 21, 22 eccentric to the longitudinal axis of drive shaft 13 so that rotation of the discs in either direction imparts oscillation to the arms 18a, 19a of the clutch members 18, 19, and, therefore, imparts a continuous movement to the driven shaft 15 and at any selected speed relative to the speed of the drive shaft.

I claim:

1. A variable speed transmission mechanism comprising, in combination, a drive shaft, a driven shaft, a pair of one-way clutch levers mounted on the driven shaft with their outer ends positioned at opposite sides of the drive shaft and adapted when oscillated toward and away from each other to alternately impart revoluble one-directional movement to the driven shaft, means comprising a pair of disks mounted on the drive shaft, there being an annular groove formed in a side face of each disk for receiving an outer end portion of a clutch lever, and means for adjusting said disks relative to each other and transversely of the drive shaft to predetermined positions on the drive shaft whereby rotation of said disks impart oscillatory movements of equal amplitude to said clutch levers in opposite directions for all positions of said disks.

2. A variable speed transmission mechanism comprising, in combination, a drive shaft, a driven shaft, a pair of one-way clutch levers of equal effective lengths in all operating positions mounted on the driven shaft with their outer ends positioned at opposite sides of the drive shaft and adapted when oscillated toward and away from each other to alternately impart revoluble one directional movement to the driven shaft, a pair of disks mounted face to face on the drive shaft and each formed on its outer face with an annular groove for receiving an outer end portion of one of said levers, and means on the drive shaft and slidable through openings in both disks to uniformly adjust them relative to each other transversely of said drive shaft so that the said levers will stand at equal angles relative to a line passing through the centers of the drive and driven shafts for all positions of said disks.

3. A variable speed transmission mechanism comprising, in combination, a drive shaft, a driven shaft, a pair of one-way clutch levers of equal effective lengths in all operating positions mounted on the driven shaft with their outer ends positioned at opposite sides of the drive shaft and adapted when oscillated toward and away from each other to alternately impart revoluble one directional movement to the driven shaft, a pair of disks mounted face to face on the drive shaft and each formed on its outer face with an annular groove for receiving an outer end portion of one of said levers, and means on the drive shaft and slidable through openings in both disks to uniformly adjust them relative to each other transversely of said drive shaft so that the ends of said levers engage their respective disks in a common perpendicular plane extending lengthwise of said drive shaft, whereby rotation of said disks imparts oscillatory movement of equal amplitude to said clutch levers in opposite directions.

4. A variable speed transmission mechanism comprising, in combination, a drive shaft, a driven shaft, a pair of one-way clutch levers of equal effective lengths in all operating positions mounted on the driven shaft with their outer ends positioned at opposite sides of the drive shaft and adapted when oscillated toward and away from each other to alternately impart revoluble one-directional movement to the driven shaft, a pair of disks mounted in close relation to each other on the drive shaft and each formed on its outer face with an annular groove for receiving an outer end portion of one of said levers, means comprising two pairs of oppositely disposed wedges positioned on opposite sides of the drive shaft and slidable thereon through openings in both disks, whereby both disks are uniformly adjusted relative to each other transversely of the drive shaft to position said grooves concentric with the axis of the drive shaft or eccentric thereto.

5. In a variable speed transmission mechanism having a drive shaft, a driven shaft, and a pair of one-way clutch levers mounted on said driven shaft, means for imparting variable oscillatory movements to said clutch levers comprising a pair of cams mounted on said drive shaft and directly engaging the outer ends of said clutch levers at equal distances from the axis of the driven shaft, and means for adjusting the cams comprising two pairs of oppositely arranged wedges positioned on opposite sides of the drive shaft and movable as a unit thereof through openings formed in both disks whereby the disks are adjusted uniformly transversely of the drive shaft.

GUSTAV H. FRANGQUIST.